(No Model.)
F. A. LOMONT.
JOINT FOR VEHICLE WHEEL RIMS.
No. 561,119. Patented June 2, 1896.
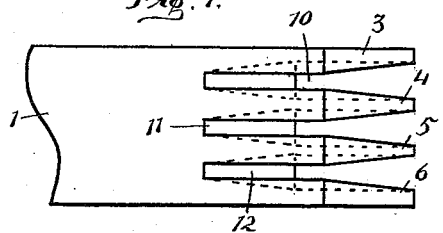
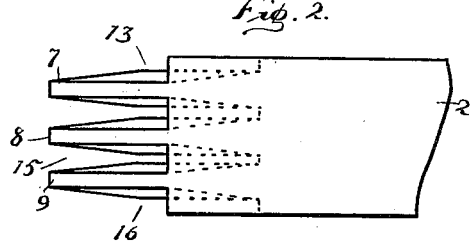
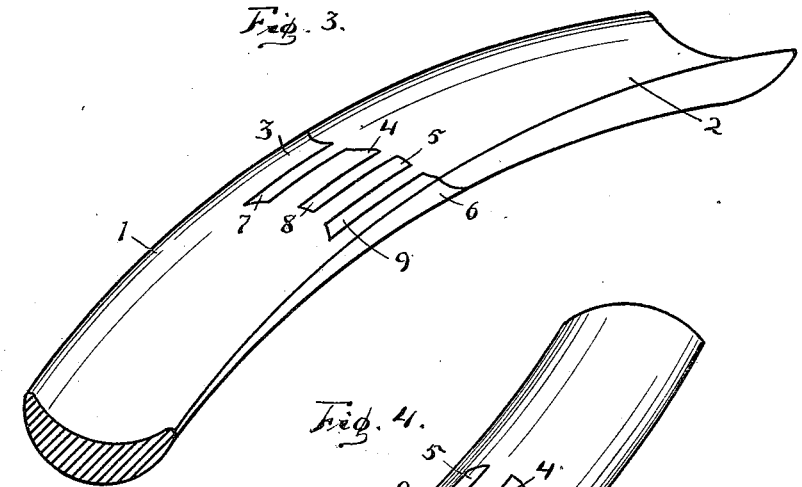
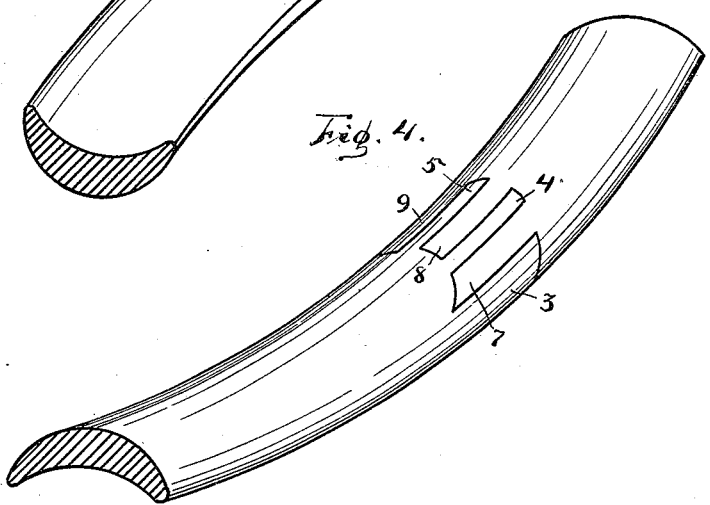
WITNESSES:
Walter G. Burns
James H. Power
Francis A. Lomont INVENTOR
BY Chapin & Denny
his ATTORNEYS.

UNITED STATES PATENT OFFICE.

FRANCIS A. LOMONT, OF EATON, INDIANA.

JOINT FOR VEHICLE-WHEEL RIMS.

SPECIFICATION forming part of Letters Patent No. 561,119, dated June 2, 1896.

Application filed July 19, 1895. Serial No. 556,476. (No model.)

*To all whom it may concern:*

Be it known that I, FRANCIS A. LOMONT, a citizen of the United States, residing at Eaton, in the county of Delaware, in the State of Indiana, have invented certain new and useful Improvements in Joints for Vehicle-Wheel Rims; and I do hereby declare that the following is a full, clear, and exact description of the invention, which will enable others skilled in the art to which it appertains to make and use the same, reference being had to the accompanying drawings, which form part of this specification.

My invention relates to improvements in rim-joints for vehicle-wheels, specially adapted and designed for wooden bicycle-rims.

My invention comprises an interlocking joint for the opposite ends of wooden rims for vehicle-wheels, formed by providing each of the said ends with a series of vertically-beveled and interlocking tenons whose outer ends are obliquely tapering to form a miter-joint, the said tenons being so constructed that one series have their vertical sides beveled outwardly toward the concave perimeter of the rim, and the series upon the other and interlocking rim end have their vertical sides beveled inwardly toward the inner and convex perimeter of the rim, thereby forming a firm interlocking union, which is secure against either lateral or vertical displacement and which is adapted to resist the most severe torsional strains incident to ordinary use.

The object of my invention is to provide a firm and secure interlocking joint for wooden rims for bicycle-wheels which can be readily and cheaply made, having its tenons so arranged and so united when in position as to be secure against either vertical or lateral displacement without even the use of glue, the interlocking ends being so constructed and united as to preserve at the joint the greatest strength possible and being specially adapted to resist the torsional strain to which all bicycle-rim joints are subjected in practical use.

The novel feature of my invention consists in the construction and arrangement of the interlocking tenons whereby each series has its sides vertically beveled, but in opposite directions, and the meeting rim ends form also a mitered union, thereby affording security against vertical displacement and torsional strain when in use.

In the accompanying drawings, forming part of this specification, similar figures of reference indicate similar parts throughout the several views.

Figure 1 is a plan of one of the meeting rim ends forming my improved joint, showing their construction before the rim has been turned into shape to receive the rubber tire. Fig. 2 is a plan of the other interlocking rim end, showing the outwardly or upwardly tapering sides of the tenons. Fig. 3 is a perspective of my improved joint, showing the relative arrangement of the registering tenons when in position and the rim is turned into proper shape to receive the tire. Fig. 4 is another perspective of the same, showing the appearance of the registering tenons upon the lower and convex side of the rim.

The wooden rim shown in the drawings is of the usual concavo-convex form in common use for bicycle-wheels, preferably made of one piece of wood, and the abutting ends and interlocking tenons when in engagement preserve for the joint in all respects the general contour of the rim.

The abutting rim end 1 is provided with the outer tenons 3 and 6, whose outer edges are convex and conform to the general contour of the rim, and with the inner tenons 4 and 5 identical with each other in construction and outline, and having their upper edge somewhat wider than their lower edge, preferably about twice the width, as shown by dotted outline in Fig. 1, the oblique outer ends of the said tenons being cut away on a line parallel to the inner and oblique ends of the adjacent mortises 10, 11, and 12, which are adapted to receive the interlocking tenons 7, 8, and 9, respectively. The other abutting rim end 2 is provided with the forwardly-projecting tenons 7, 8, and 9, similar in all respects in outline, and having their upper edge more narrow than their lower edge, preferably about one-half the width, as seen in Fig. 2. The outer ends of the said tenons 7, 8, and 9 are oblique and adapted to correspond with the inner ends of the said mortises 10, 11, and 12 against which they respectively abut when driven home and in position. The mortises 14 and 15 also have their inner ends oblique and in a line parallel with the outer ends of the said tenons 7, 8, and 9, and are adapted to register with the said tenons 4 and 5. The outer edges of the said end 2 are cut away, as seen in Fig. 2, leaving the spaces 13 and 16 adapted to receive and register with the tenons 3 and 6 of the abutting end 1, as seen in Figs. 3 and 4. It is obvious that when the said interlocking tenons of the abutting rim ends are united and driven home they will form a dead-lock even without the use of glue, and that either lateral or vertical displacement will be impossible in ordinary use.

It is obvious that this form of joint can be readily and cheaply manufactured by well-known means and in a well-understood manner, and the interlocking ends can be conveniently glued and then readily and securely united.

While my improved joint is specially adapted and designed for bicycle-rims, I do not hereby limit myself to such use, as I contemplate adapting it to other vehicle-rims.

Having thus described my invention and the manner in which the same is to be employed, what I claim as my invention, and desire to secure by Letters Patent, is—

1. The combination in a joint for vehicle-rims, of one interlocking end or section having the plano-convex tenons 3 and 6 adapted to embrace the abutting end or section, a series of longitudinal mortises having oblique ends, as described, and a series of downwardly-beveled tenons adapted to register with a series of corresponding mortises in the abutting end or section, with another interlocking end or section having a series of upwardly-beveled tenons with oblique ends, adapted to register with the said mortises of the other abutting end, and having a series of mortises with beveled inner ends adapted to receive the said downwardly-beveled tenons, all substantially as described.

2. A vehicle-rim joint comprising two interlocking ends or sections, adapted to form a locked union, as shown, and preserving the general contour of the rim, one of the said ends having a series of downwardly-beveled tenons with oblique outer ends adapted to register with a series of corresponding mortises in the other and abutting end or section of the rim, all substantially as set forth and described.

3. A joint for vehicle-rims consisting of two interlocking ends or sections, one of the said ends having a series of upwardly-beveled longitudinal mortises 10, 11 and 12 having oblique inner ends as described, the upwardly-beveled tenons 4 and 5 having oblique outer ends, and adapted to register with corresponding mortises in the other interlocking end, and the external arms 3 and 6 for the purpose specified, the other interlocking end or section having a series of upwardly-beveled tenons 7, 8, and 9 with oblique ends adapted to register with the said mortises 10, 11, and 12 respectively, and the mortises 13, 14, 15, and 16 adapted to receive the said tenons 3, 4, 5, and 6 respectively, all substantially as described.

Signed by me at Eaton, Delaware county, State of Indiana, this 12th day of July, A. D. 1895.

FRANCIS A. LOMONT.

Witnesses:
THOMAS H. HORN,
GEORGE C. HUFFMAN.